(12) United States Patent
Chen et al.

(10) Patent No.: US 8,487,551 B1
(45) Date of Patent: Jul. 16, 2013

(54) ULTRA-HIGH EFFICIENCY BALLAST WITH END OF LAMP LIFE PROTECTION

(76) Inventors: Timothy Chen, Aurora, OH (US); James Kevin Skully, Willoughby, OH (US)

( * ) Notice: Subject to any disclaimer, the term of this patent is extended or adjusted under 35 U.S.C. 154(b) by 524 days.

(21) Appl. No.: 12/773,015

(22) Filed: May 4, 2010

(51) Int. Cl.
*H05B 37/02* (2006.01)

(52) U.S. Cl.
USPC ........... 315/307; 315/308; 315/311; 315/177; 315/209 R (58) Field of Classification Search
USPC ............. 315/177, 186, 189, 192, 193, 209 R, 315/220, 221, 222, 224, 225, 226, 254, 255, 315/256, 257, 276, 277, 278, 279, 282, 287, 315/299, 361, 362
See application file for complete search history.

(56) References Cited

U.S. PATENT DOCUMENTS

| | | | | | |
|---|---|---|---|---|---|
| 4,506,195 | A | * | 3/1985 | Elms | ............................. 315/205 |
| 5,008,597 | A | * | 4/1991 | Zuchtriegel | ............... 315/209 R |

\* cited by examiner

*Primary Examiner* — Douglas W Owens
*Assistant Examiner* — Jianzi Chen
(74) *Attorney, Agent, or Firm* — Joseph H. Taddeo (57) ABSTRACT

In one embodiment, a self-oscillating electronic ballast for discharge tube type lamps which increases efficiency and has IEC-standard end of lamp life protection. Efficiency is enhanced by placing primary resonant capacitor (351a) in parallel with cathode conduction loop (270) while retaining a minimal secondary resonant capacitor (351b) within the cathode conduction loop (270). IEC-standard end of lamp life protection is achieved by placing the primary winding (323) of the base drive transformer (357) within the cathode conduction loop (270) of the ballast circuit, and employing a dampening capacitor (307) to suppress the erroneous base drive signals generated by coupling in the secondary windings (325, 327) as a lamp nears end of lamp life. Other embodiments are described and shown.

20 Claims, 4 Drawing Sheets

*FIGURE 1*

*(Prior Art)*

FIGURE 2

(Prior Art)

ULTRA-HIGH EFFICIENCY BALLAST WITH END OF LAMP LIFE PROTECTION

CROSS REFERENCE TO RELATED APPLICATIONS

This application claims the benefit of provisional patent application Ser. No. 61/215,191, filed May 1, 2010 by the present inventors, TIMOTHY CHEN AND JAMES KEVIN SKULLY, which is incorporated herein by reference.

FIELD OF THE INVENTION

The present application relates generally to a ballast circuit for fluorescent lamps. Specifically, this application relates to a self-oscillating ultra-high efficiency electronic ballast circuit incorporating cost-effective protection for open-cathode and other end of lamp life failure modes.

BACKGROUND OF THE INVENTION

Fluorescent lighting systems of various types are commonly employed in a myriad of lighting applications. All fluorescent lighting systems are gas-discharge lamp systems and generate light by sending an electrical discharge through an ionized gas. The gas in any such system must be isolated from the surrounding atmosphere and electrically driven to a sufficient and sustained state of excitement to generate steady light. Therefore, all fluorescent lighting systems have at their heart a discharge envelope to isolate the gas mixture and a ballast circuit to excite the gas.

Discharge envelopes in the most common fluorescent lighting systems consist of a glass tube coated on the inside with an electroluminescent compound. The tube may be formed into a variety of shapes, such as a simple linear tube, a circular tube, and a wide variety of other formed tube shapes, including the increasingly familiar spiral form compact fluorescent lamp. The two ends of the tube are sealed to enclose a gas mixture commonly including a noble gas and mercury vapor. Electrodes are located at the ends in order to supply electric current to the gas mixture. While a variety of electrode forms are viable, electrodes in the ends of fluorescent discharge tubes commonly cathodes which take the form of a filament between two conductive pins which extend through the tube ends.

Ballast circuitry is necessary to provide both the initial ionization voltage to allow the arc between the electrodes in the discharge tube to strike, to continue to drive the gas mixture in the discharge tube to the correct sustained state of excitement, and to limit the current through the tube to a proper value for the tube. Depending upon the desired application, ballast circuitry may be integrated with the lamp discharge tube, or housed separately from a separable lamp.

Ballast circuitry for discharge lamps has in the past two decades undergone rapid advancement, isolating certain basic design concepts common to the majority of ballast circuits currently in production. The ballast circuitry generally incorporates an AC to DC rectification circuit, an ignition circuit, and bipolar transistors arranged in a self oscillating circuit. The rectification and ignition circuits vary little from design to design in the industry, and generally perform acceptably. However, the self oscillating circuits commonly used in electronic ballasts often perform undesirably as the lamp approaches the end of lamp life.

A basic self-oscillating ballast circuit passes all voltage in parallel through the discharge tube and a resonant capacitor. Where the first and second electrodes of the discharge tube take the form of a filament between two conductive pins, one or more electrode filament may fail and be open as the lamp approaches end of lamp life. The discharge between the electrodes no longer moves from filament to filament, but migrates instead to the pins. This situation significantly reduces the efficiency of the discharge and lamp and causes the electrodes to overheat.

In many discharge lamp applications, such as in compact fluorescent lamps or CFLs, the electrode ends of the discharge tube are in contact with a plastic housing. Though the overheated electrodes remain sealed within the discharge tube, they may reach temperatures in excess of 800 degrees Fahrenheit. This heat is conducted through to the exterior of the tube, causing the plastic to discolor, melt, and even burn, which is undesirable. Even when the electrode ends of the discharge tube are not in contact with a plastic housing, it is nevertheless undesirable to have superheated lamp tube surfaces.

An early solution to this problem was to connect the resonant capacitor through the filaments of the electrodes in series. When either filament opens, the resonant capacitor is disconnected, and circuit oscillation ceases. This operation prevents undesirable extreme overheating of the electrode due to filaments failing open near end of lamp life.

Figure 1:
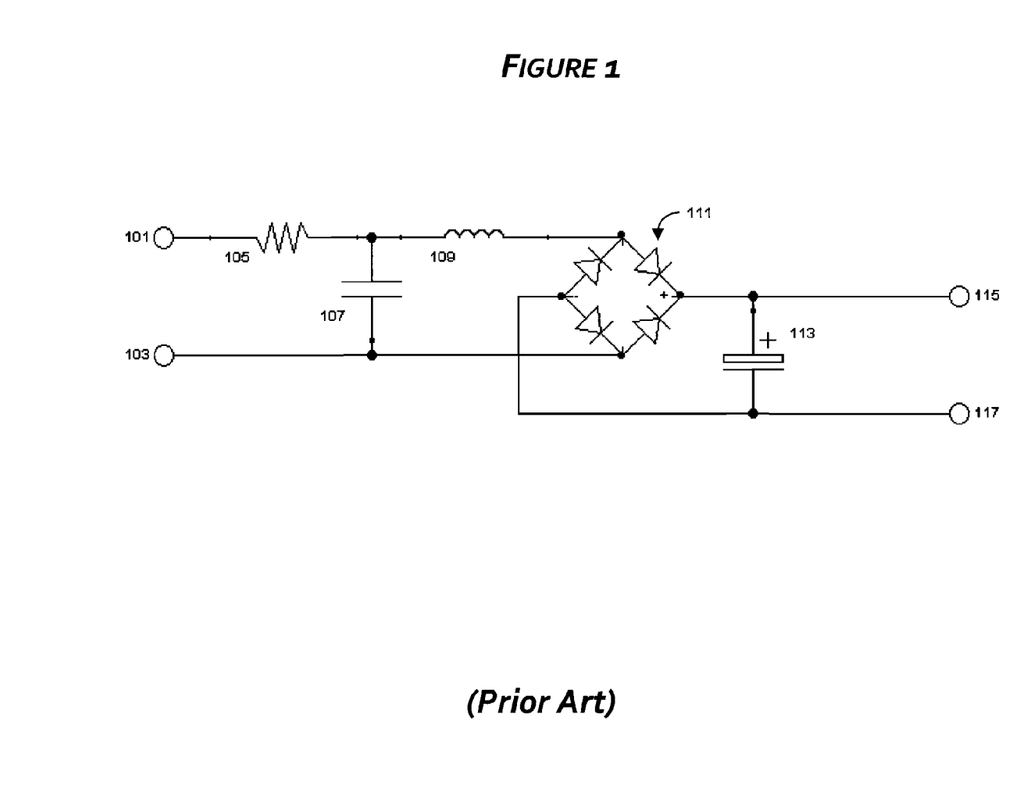
FIG. 1 shows a circuit diagram for an exemplary AC to DC rectification and smoothing circuit portion suitable for use in an electronic ballast circuit for a discharge lamp.
Figure 2:
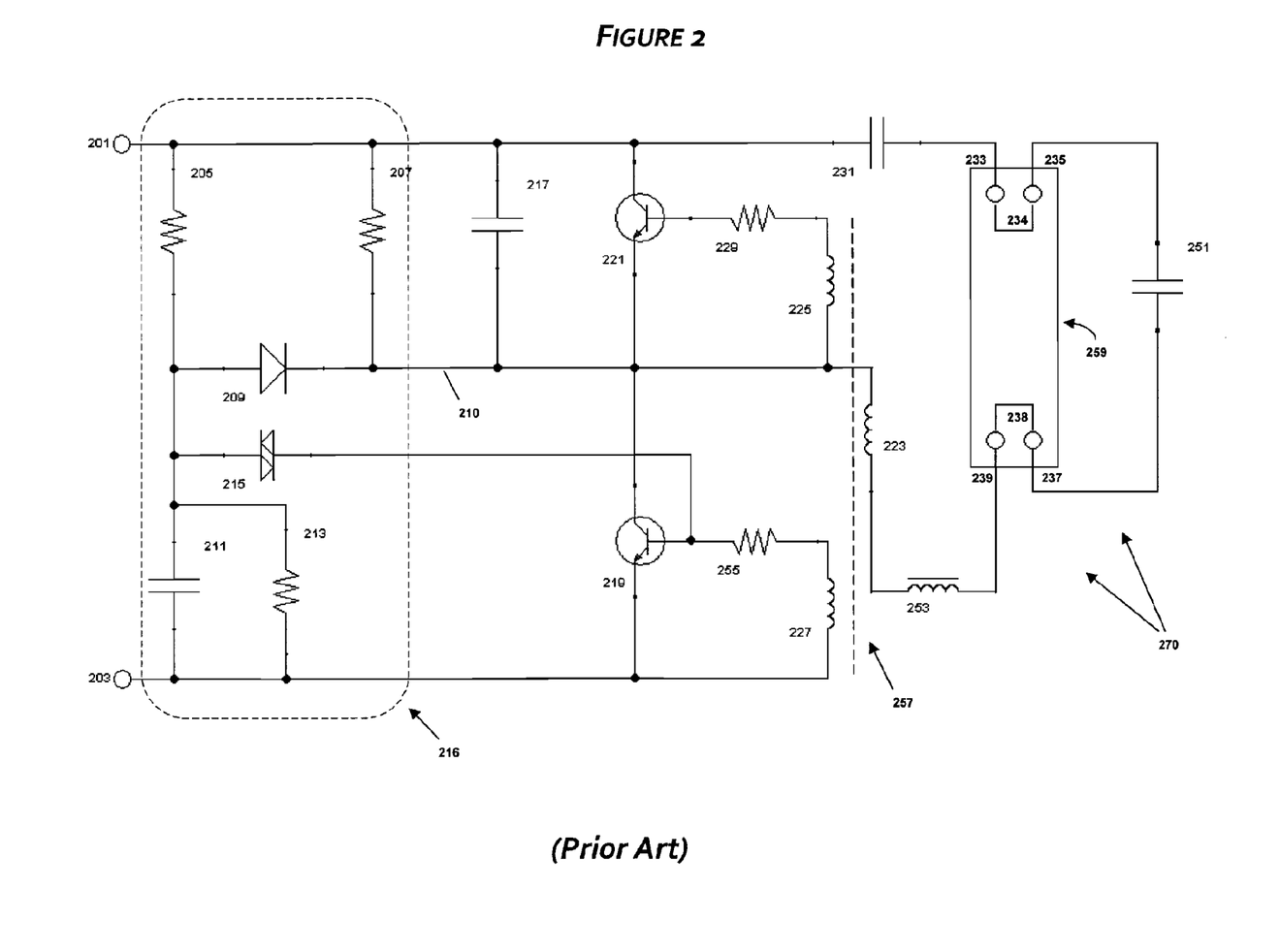
FIG. 2 shows a circuit diagram for an exemplary ignition and basic electronic ballast circuit portion for a discharge lamp.

FIG. 2 shows a circuit diagram for an exemplary ignition and basic electronic ballast circuits portion for a discharge lamp incorporating this early solution. Voltage bus 201 and circuit common terminal 203 are respectively connected to or continued from positive bus wire 115 and negative bus wire 117 of FIG. 1. Voltage bus 201 is connected through charging resistor 205 to the anode of branch drawdown diode 209 and to first leads of diac 215, startup capacitor 211, and bleed resistor 213. Second leads of startup capacitor 211 and bleed resistor 213 are connected to circuit common 203. The cathode of drawdown diode 209 connects to half-bridge point 210. Pull-up supply resistor 207 bridges voltage bus 201 and half-bridge point 210. As described and shown, these components form ignition component 216 for an electronic ballast circuit.

A second lead of diac 215 connects to the base of first switching device or transistor 219. The collector of first switching device 219 is connected to half-bridge point 210. The emitter of first switching device 219 is connected to circuit common 203, and also through the series of first secondary winding 227 of base drive transformer 257 and first base current resistor 255 back to the base of first switching device 219.

Voltage bus 201 is connected to the collector of second switching device or transistor 221. Emitter of second switching device 221 is connected to half-bridge point 210. Half-bridge point 210 is also connected back to base of second switching device 221 through the series of second secondary winding 225 of base drive transformer 257 and second base current resistor 229. Snubber capacitor 217 bridges voltage bus 201 and half-bridge point 210 in parallel with collector and emitter of second switching device 221.

Voltage bus 201 is connected in series through DC blocking capacitor 231, to first pin 233 of discharge tube assembly 259. First pin 233 and second pin 235 are connected to the first and second leads respectively of first electrode filament 234, and support filament 234 at the correct location within the discharge tube. Second pin 235 is connected in series through resonant capacitor 251 to third pin 237 of discharge tube assembly 259. As with first electrode filament 234, third pin 237 and fourth pin 239 are connected to the first and second leads respectively of second electrode filament 238, providing similar support. Fourth pin 239 is connected to a first lead of resonant inductor 253. Second lead of resonant inductor 253 is connected in series through primary winding 223 of base drive transformer 257 back to half-bridge point 210.

In operation, two BJT transistors, 219 and 221, form a half-bridge inverter stage to output a square voltage wave. The square wave is snubbed by snubber capacitor 217 to reduce electromagnetic interference and transition stress on transistors 219 and 221, and other components. Resonant capacitor 251 and resonant inductor 253 form a resonant matching network to shape the snubbed output waveform, provide a proper starting voltage to strike an arc between cathodes 235 and 238 in discharge tube 259, and stabilize the lamp arc current during steady state operation. DC blocking capacitor 231 prevents DC voltage across resonant inductor 253, and additionally provides power to collector of transistor 221 during the oscillation cycle. The self-oscillating drive circuitry includes a base drive transformer 257 with one primary winding 223 and two secondary windings 225 and 227, and base current resistors 229 and 255. Base drive transformer 257 draws the resonant inductor current back through its primary winding 223 and is converted into a complementary voltage in the secondary windings 227, 255 to drive the bases of the respective transistors 221 and 219.

As lamp current and capacitor current are passed through the primary winding 223 of base drive transformer 257, the core of transformer 257 enters saturation and ceases to transfer power to the secondary windings. This saturation is desirable and assists the switching process, ending the base drive signal and rendering the transistors 219, 221 nonconductive.

An initial base pulse is provided to base of transistor 219 by ignition component 216. In operation, startup capacitor 211 is charged through charging resistor 205. Resistor 205 and bleed resistor 213 provide a divider to prevent overcharge of startup capacitor 211. Resistors 205 and 213 are typically of relatively high resistance values, with the resistance value of charging resistor 205 higher than that of bleed resistor 213. Once charge of capacitor 211 is sufficient to break down diac 215 to conductance, this first conductance provides the initial base pulse to transistor 219. Power to the collector of transistor 219 is provided during this initial cycle through initial supply resistor 207, which is typically of high resistive value. In subsequent cycles, power to base of transistor 219 is drawn from capacitor 211 through diode 209, with diode 209 operating to keep the charge on capacitor 211 below the breakdown value of diac 215 and preventing the re-firing of the initial base pulse.

The circuit described with reference to FIG. 2 is in common use in a variety of embodiments and variations, because it prevents oscillation of the circuit when a cathode filament 234, 238 fails open or when the lamp is removed from the ballast circuit. This arrangement, while improved, still exhibits undesirable characteristics because all current must flow through the cathode conduction loop. First, the circuit is inefficient. Directing all power through the electrodes causes significant power dissipation without producing light, and limiting the efficiency of the circuit's light output to around 85%. Additionally the increased thermal wear on the filament reduces lamp life.

Second, the end of lamp life protection on this circuit is limited. As a lamp 259 approaches end of lamp life, a failing filament 234, 238 may be of high resistive value while current may yet flow through it. Indeed, a filament 234, 238 may fail open and arc to complete the circuit. In these situations, power still flows through the cathode conductance loop and into the primary winding of base drive transformer, allowing oscillation to continue. This is undesirable as power is dissipated as heat at a rate much higher even than under normal operating conditions. The heat may reach potentially dangerous levels, and the efficiency of the lamp and ballast circuit is drastically reduced. Additionally, the ballast may cease to oscillate consistently, causing reduced light output or visually disturbing flickering and pulsing. These end of lamp life modes do not meet recognized end of lamp life protection standards.

A variety of end of lamp life protection solutions have been proposed. Few if any meet the trio of desirable characteristics—Efficiency, IEC qualification, and cost-effectiveness.

U.S. Pat. No. 5,019,751, granted May 28, 1991, to I. L. Flory, IV, et al., discloses a disabling circuit for deactivating a high pressure sodium lamp starting and operating circuit when the lamp exhibits end-of-life cycling includes a normally closed thermal switch connected to the starting and operating circuit is inoperative, the switch having contacts which open in response to an elevated temperature. A heating element is connected in parallel with the lamp so that the voltage across the lamp is applied to the heating element. The heating element is supported in a selected heat conducting relationship with the thermal switch so that a predetermined elevated temperature is reached and the contacts are opened only after the dissipation of an amount of energy resulting from repeatedly high lamp open-circuit voltage accompanying end-of-life cycling.

U.S. Pat. No. 5,475,284, granted Dec. 12, 1995, to J. N. Lester, et al., discloses a ballast that includes an inverter for providing an AC voltage to a discharge lamp. As the lamp approaches end-of-life, a DC voltage component develops across the lamp. The ballast includes circuitry for monitoring the condition of each of the cathodes by measuring this DC voltage component. After a predetermined increase in this DC voltage component, the inverter is disabled in order to prevent excessive heating of the cathodes.

U.S. Pat. No. 5,574,335, granted Nov. 12, 1996, to Y. Sun, discloses a ballast that includes an inverter for providing an AC voltage to a discharge lamp. As the lamp approaches end-of-life, a DC voltage component develops across the lamp. The ballast includes circuitry for monitoring the condition of each of the cathodes by measuring this DC voltage component. After a predetermined increase in this DC voltage component, the inverter is disabled in order to prevent excessive heating of the cathodes. The inverter is also disabled as a result of a resonant or near resonant mode condition of a tank circuit caused by an open circuit condition or a leaking lamp.

U.S. Pat. No. 5,925,986, granted Jul. 20, 1999, to M. Moisin, discloses an improved ballast circuit for controlling the power delivered to a fluorescent lamp. The present invention uses a complex resonating circuit to dynamically adjust the power being delivered to the load. The present invention also operates in burst mode allowing an increased voltage to be applied across the lamp load without overstressing the circuit. The increased voltage will light both lamps nearing the end-of-life and lamps in cold weather.

U.S. Pat. No. 6,366,032, granted Apr. 2, 2002, to J. M. Allison, et al., discloses a resonant fluorescent lamp ballast that includes an IC driver for a half-bridge arrangement that supplies AC current to a lamp. The IC creates a frequency sweep from a pre-heat frequency, through a resonant frequency, to a still lower operating frequency. A pre-heat pin in the IC triggers a re-start or the frequency sweep when a first signal exceeds a first threshold level. A shut-down pin in the IC associated with an internal shut-down latch shuts down the driver when a second signal exceeds a second threshold level. Pre-heat trigger circuitry detects a current spike through half-bridge switches when the lamp has not yet started, supplying the pre-heat pin with a first signal exceeding the first threshold level. End-of-life circuitry provides to the shut-down pin a second signal exceeding the second threshold level if lamp current fails to reach a substantial portion of its normal level within a predetermined time. A DC current-supply path is provided from a DC current supply, through at least one filament of each lamp in the load circuit, to a power-supply pin for the IC. The end-of-life circuitry cooperates with the pre-heat trigger circuitry by limiting the number of the frequency sweeps to no more than occur during the predetermined time set by the end-of-life circuitry. The DC path cooperates with the end-of-life circuitry and the internal shut-down latch to reset the latch when the DC path is broken due to absence of the at least one filament in the path.

U.S. Pat. No. 6,828,732, granted Dec. 7, 2004, to K. J. Yang, et al., discloses a fluorescent lamp end-of-life protection circuit in an illuminating electric appliance, including a rectifying effect protection circuit for a lamp tube and an overvoltage protection circuit for the lamp tube, in which a circuitry of two series resistors and a capacitor in series is connected in parallel with the lamp tube. A cathode of a transient voltage suppresser is connected to one end of the lamp tube, its anode is connected to an anode of a diode, and a cathode of the diode is connected to a common node of two series resistors. One end of a trigger diode is connected to a common node of the capacitor and the resistor, and the other end thereof is connected to a gate terminal G of a triac, a first electrode and a second electrode of which are connected to two ends of the lamp tube respectively.

U.S. Pat. No. 6,906,465, granted Jun. 14, 2005, to A. Cavallaro, discloses a self-ballasted fluorescent lamp that comprises a housing formed to contain a ballast. The housing has a top surface with openings leading from the exterior of the housing to the interior. The openings can be in the form of raised bosses having upstanding walls. A restricted portion, which can take the form of a flange, is formed with the opening and a safe end-of-life enabling device is positioned in the opening and in contact with the restricted portion. The safe end-of-life device is tubular, has low thermal conductivity and in preferred forms of the invention is a glass such as quartz or a ceramic such as aluminum oxide. The ends of a fluorescent lamp penetrate the tubular end-of-life device and extend into the interior of the housing for suitable connection to an enclosed electronic ballast. A retainer is positioned opposite the restricted portion for maintaining the end-of-life device within the opening. The retainer is a typical compact fluorescent cement that is used to fix the lamp to the housing. Alternatively, the retainer can be an adhesive silicone or a threaded washer.

Hence, the prior art recited above does not teach of the novel advantages that are found in the present invention.

What is needed is an improved ballast circuit that is responsive to a fluorescent lamp that is nearing end of lamp life and operating outside of its normal, efficient, and safe operating performance level.

Accordingly, it is therefore an object of the present invention to provide for a novel electronic ballast circuit to operate a compact fluorescent lamp that will turn off the lamp and ballast in both high impedance and open cathode end of lamp life failure modes by stopping oscillation of the ballast circuit. It is an additional object of the present invention to ensure that this end of lamp life protection is delivered in the most energy efficient manner.

SUMMARY OF THE INVENTION

Observing the shortcomings of the prior art discussed above, it is an object of this invention to provide, in one embodiment, a self-oscillating electronic ballast for discharge tube type lamps which increases efficiency and has IEC-standard end of lamp life protection.

In embodiments, the present invention enhances efficiency in a variety of ways. Placing a primary resonant capacitor in parallel with the cathode conduction loop while retaining a minimal secondary resonant capacitor within the cathode conduction loop significantly reduces the amount of power dissipated as heat through the cathode filaments. This can save 80% or more of the energy otherwise lost to such dissipation. Additionally, driving the bases of the transistors in the self-oscillating circuit with a high-impedance, low saturation transformer allows the operating frequency of the self-oscillating circuit to approach the resonant frequency of the load. Efficiency of the ballast increases significantly as these frequencies near each other, leading to an efficiency improvement of as much as 10%.

End of lamp life protection compliant with internationally recognized standards is also achieved by embodiments of the present invention. The primary winding of the base drive transformer is placed within the cathode conduction loop of the ballast circuit, and a decoupling capacitor damps the erroneous base drive signals generated by coupling in the secondary windings as a lamp nears end of lamp life. This arrangement invariably forces the ballast circuit to cease oscillation when a cathode filament opens or presents unduly high impedance. Additionally, balancing diodes protect the oscillating transistors from damage due to reverse bias in current which may occur as a lamp approaches end of lamp life.

Certain embodiments additionally exhibit self-corrective behavior in response to operating environments. As disclosed and shown, should the oscillating circuit be underdriven, the resulting increase in current on the resonant load and subsequently on the base driving circuitry drives the circuit back to normal operating parameters.

DETAILED DESCRIPTION OF THE INVENTION

The present invention provides an increase in the efficiency of self-oscillating resonant ballast and lamp circuits over the normal operating life of the lamp. Additionally it provides a cost effective end of lamp life solution for a self-oscillating resonant electronic ballast, offering protection against overheating and meeting IEC end of lamp life protection standards. Referring now to FIG. 1, an exemplary AC to DC rectification and smoothing circuit suitable for use with embodiments of the invention is described. AC current is supplied to the circuit on hot wire 101 and neutral wire 103. Hot wire 101 is connected in series through fusible resistor 105 to EMI suppression capacitor 107 and EMI Suppression Inductor 109. Capacitor 107 is connected back to neutral 103. Inductor 109 is connected through to an AC terminal of diode bridge rectifier 111. The second AC terminal of rectifier is connected back to capacitor 107 and to neutral 103. The positive terminal of rectifier 111 is connected to the positive terminal of electrolytic capacitor 113 and to positive bus wire 115. The negative terminal of rectifier 111 is connected to the negative terminal of electrolytic capacitor 113 and to negative bus wire 117.

Figure 3A:
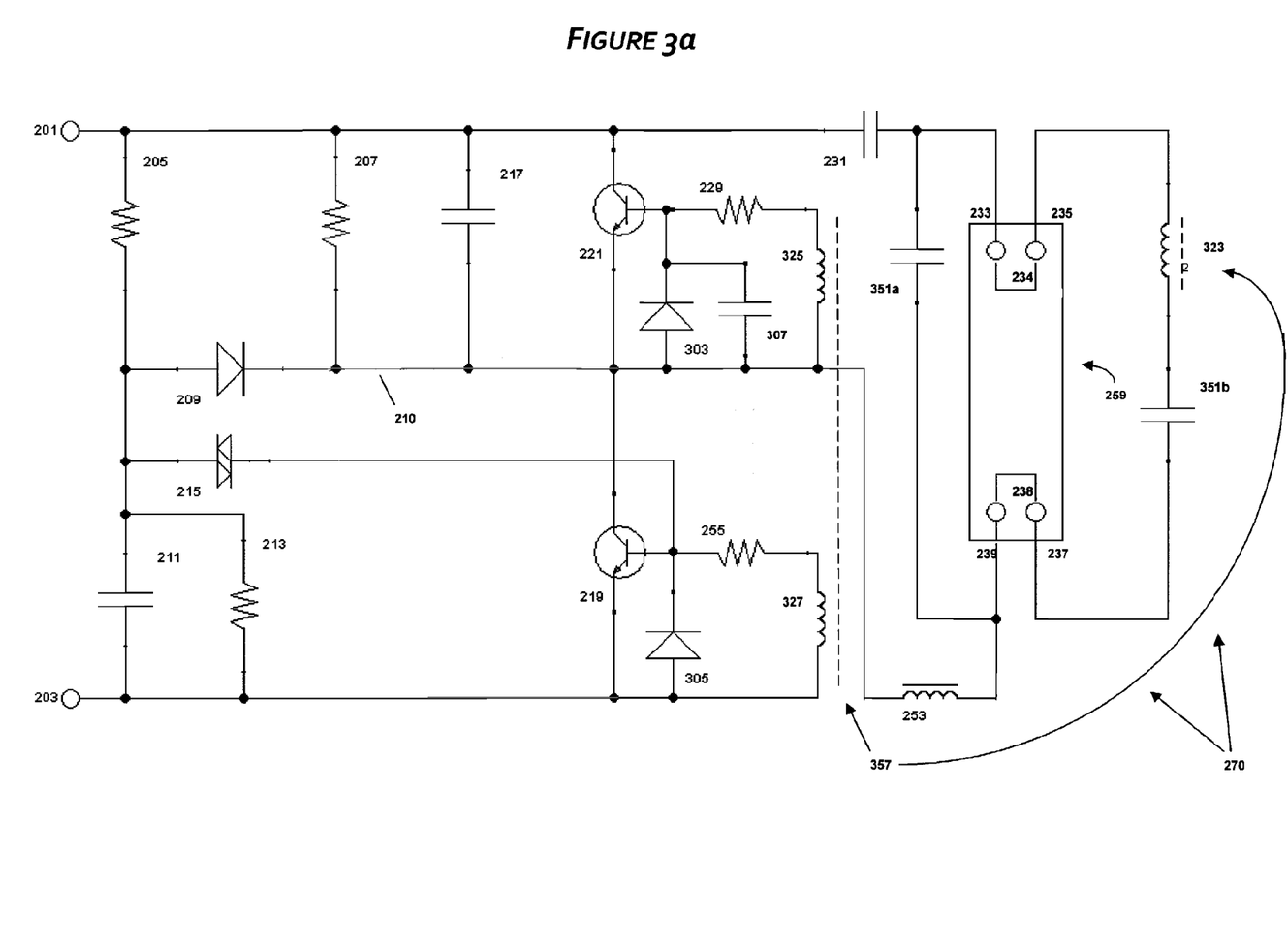
FIG. 3*a* shows a circuit diagram incorporating a first embodiment of the invention.

FIG. 3a shows a circuit diagram for an embodiment of the present invention in an improved electronic ballast circuit for a discharge lamp. Certain additions to, modifications to and rearrangements of the components of the circuit described in FIG. 2 have been made. Primary winding 323 of base drive transformer 357 is no longer positioned in series between resonant inductor 253 and half-bridge point 210. It is instead positioned in series between second pin 235 and secondary resonant capacitor 351b in the cathode conduction loop. Anode of second load balancing diode 303 is connected to half-bridge point 210, while cathode of second load balancing diode 303 is connected to base of second transistor 221. A first lead of dampening capacitor 307 is connected to half-bridge point 210, while a second lead of dampening capacitor 307 is connected to base of second transistor 221, in parallel with second load balancing diode 303. Anode of first load balancing diode 305 is connected to circuit common 203, while cathode of first load balancing diode 305 is connected to base of first transistor 219. A first lead of primary resonant capacitor 351a is connected to second lead of DC blocking capacitor 231 and to first pin 233; and second lead of DC blocking capacitor is connected to fourth pin 239 and first lead of resonant inductor 253; placing primary resonant capacitor 351a in parallel with cathode conduction loop.

Figure 3B:
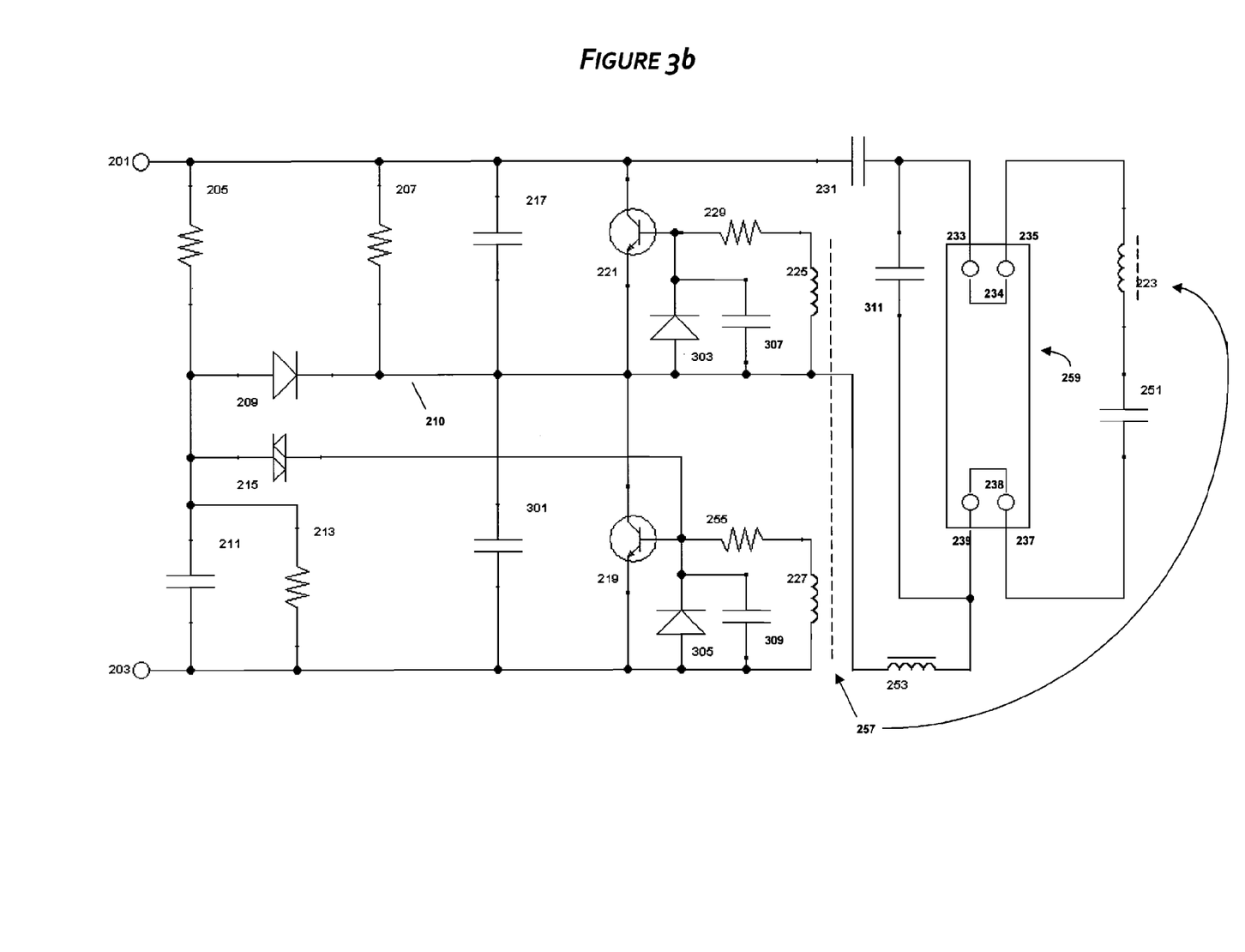
FIG. 3*b* shows a circuit diagram incorporating a second embodiment of the invention.

Referring now to FIG. 3b, a circuit diagram showing an alternative embodiment of the invention in a ballast circuit. As shown, certain components have been added to the circuit. A first lead of second snubber capacitor 301 is connected to half-bridge point 210, and second lead of second snubber capacitor 301 is connected to circuit common 203. Also a first lead of second dampening capacitor 309 is connected to circuit common, while a second lead of dampening capacitor 309 is connected to base of first transistor 219, in parallel with first load balancing diode 305. Alternatively, dampening capacitor 307 and snubber capacitor 217 may be removed in addition to the inclusion of capacitors 301 and 409.

Description of Operation

It is often desirable to power the lamp ballast from an alternating current utility line, but the ballast circuit itself is preferably powered by direct current voltage. Therefore, with reference to FIG. 1, a power supply bridge rectification circuit suitable for use with embodiments of the invention and other self-oscillating ballasts is described. While operation on a wide variety of power sources of is contemplated, the voltage supplied to hot wire 101 is typically approximately 120 volts within the United States. Voltages such as approximately 277 volts and 220 volts are also not uncommon. Hot wire 101 supplies power through fusible resistor 103 and inductor 109 to bridge rectifier 111. Neutral wire 103 additionally supplies power to bridge rectifier 111. Fusible resistor 103 is used here primarily as a fusing device, although other circuit breaking devices are contemplated. It is therefore of fairly low resistive value, typically less than 10 ohms and more likely less than 1 ohm on a 120 volt power supply. When the rectification and smoothing circuit is used in embodiments, a 0.47 ohm resistor is appropriate for 120 volt applications.

Capacitor 107 and inductor 109 function in concert to suppress high frequency EMI noise which may otherwise escape the ballast assembly. When the rectification and smoothing circuit is used in embodiments, values in ranges between 0.047-0.022 microfarads and 1-5 millihenrys for capacitor 107 and inductor 109, respectively can be appropriate. The values should be paired to create the proper natural resonance to suppress EMI noise at the oscillating frequency of the ballast.

Bridge rectifier 111 supplies positive DC voltage in a folded AC full wave rectified waveform to electrolytic capacitor 113. Rectifier 111 is typically a 1 amp, 400 volt capacity device, although it may be assembled from component diodes of similar capacity. Electrolytic capacitor 113 smoothes the folded AC waveform to AC ripple direct current for supply to the ballast circuit from busses 115 and 117. The current is supplied is typically of line voltage.

Such bridge rectification power supply circuits are generally well understood in the art, and while omitted from the other figures in the interests of clarity and brevity, may be included in embodiments or not as application of the invention or circumstances may require. Other sources of DC power, including electrochemical sources, are equally valid and may also be included in embodiments or not as application or circumstances may require.

With reference now to FIG. 3a, the operation of a first embodiment of the invention in a self-oscillating ballast circuit is described. The self-oscillating circuit is based on NPN bipolar junction transistors, although other switching devices, including but not limited to FETs, MOSFETs, diode assemblies, or similar electronic gating structures may be satisfactorily substituted such that they form a half-bridge inverter. It is desirable to employ low gain switching devices in order to allow for the wide range of environmental operating conditions which ballasts may encounter.

As shown, two BJT transistors, 219 and 221, form a half-bridge inverter stage to output a square voltage wave, although other switched mode power supplies may be useful in embodiments. It is desirable for the half bridge inverter to produce frequencies in excess of 20 KHz, and preferably about 40 KHz, to enhance ballast efficiency. The generated square wave is snubbed by snubber capacitor 217 to reduce transition stress on transistors 219 and 221, and on other components. Appropriate values for capacitor 217 as a snubber range from the hundreds of pico farads to the nano farads.

Primary resonant capacitor 351a, secondary resonant capacitor 351b, and resonant inductor 253 form a resonant matching network similar to that described with reference to FIG. 2. However, the single resonant capacitor 251 has been replaced with the pair of resonant capacitors 351a and 351b. Note that resonance may be achieved with inductor 253 positioned between DC blocking capacitor 231 and the parallel circuits containing the resonant capacitors 351a and 351b as well as in the location depicted. The combined capacitance of capacitors 351a and 351b and inductance of inductor 253 are chosen such that they resonate as closely as possible to the frequency of the snubbed square wave output of the half-bridge inverter stage. When the resonance so matches, DC blocking capacitor 231 prevents DC voltage across resonant inductor 253, and additionally provides power to collector of transistor 221 during the oscillation cycle. In embodiments, total capacitance for the resonant capacitors 351a and 351b between 1 and 10 nano farads and inductance for resonant inductor 253 between 0.5 milli Henrys and 2 milli Henrys are desirable for resonance around 40 KHz. The capacitance of DC blocking capacitor 231 is preferably relatively high, between 0.1 micro farads and 0.5 micro farads, such as 0.22 micro farads.

Any division of the optimal resonant capacitance between capacitors 351a and 351b is operable. However, the division of capacitance should be chosen so as to minimize the current through the cathode conduction loop to the greatest extent practicable. This minimizes power dissipation through cathode filaments 234, 238. The practicable minimum current is greatly dependent upon the design of the primary winding 223 of base drive transformer 257, and upon the required base drive current. In embodiments, it is desirable to divide the capacitance at approximately 80%-20%, respectively, between primary resonant capacitor 351a and secondary resonant capacitor 351b.

The self-oscillating drive circuitry includes a base drive transformer 357 with one primary winding 323 and two secondary windings 325 and 327, and base current resistors 229 and 255. The operation of base drive transformer differs from that described with reference to FIG. 2. Rather than draw the resonant inductor current back through its primary winding 323, base drive transformer 357 draws resonant current from the lamp voltage via capacitor 351b when placed anywhere in the cathode conduction loop, for example as depicted between pin 235 and secondary resonant capacitor 351b. The current through primary winding 323 is converted to a complementary voltage in the secondary windings 325, 327 to drive the bases of the respective transistors 221 and 219. The reduced current available from the cathode conduction loop in this embodiment will require the various windings transformer 357 to differ from those of transformer 257, described in reference to FIG. 2.

Relocation of the primary winding 323 of base drive transformer 357 to a location in the cathode conduction loop in conjunction with placing primary resonant capacitor 351a in parallel with the cathode conduction loop increases efficiency 3-10% over existing electronic ballasts, and yet provides equivalent end of lamp life protection. In this arrangement, dissipation of power through the cathodes 234, 238 is reduced by bypassing the cathode conduction loop for much of the resonant current through primary resonant capacitor 351a. Drive current for the bases of the transistors 219, 221 is sourced from the cathode conduction loop. Thus, an open cathode filament or removal of the lamp prevents oscillation of the half-bridge when residual signal is damped by decoupling capacitor 307. Such oscillation would otherwise occur due to primary resonant capacitor 351a in parallel with the cathode conduction loop, and coupling of the secondary windings 325, 327.

Advantageously, this circuit arrangement exhibits self correcting behavior when the circuit begins to vary its operating point due to environmental factors such as heat or power fluctuations. Where the half-bridge underdrives the circuit, the voltage across the discharge tube 259 between cathodes 234, 238 and the frequency of the lamp load is increased, while the current through capacitor 351b is increased. This increases current through primary winding 323 of transformer 357, driving the transistors harder, lowering the operating frequency of the self-oscillating circuit and consequently increasing power to the lamp load. This behavior is, within certain ranges of normal operating parameters, self correcting.

As the primary winding 323 does not carry lamp current, the core of transformer 357 does not enter saturation. In the arrangement of FIG. 3, saturation is no longer necessary to successful operation. The absence of saturation is desirable as it increases efficiency. Efficiency of the circuit increases as the switching frequency of the self-oscillating circuit approaches the resonating frequency of the resonant load. Any saturation forces operating frequency of self-oscillating circuit to be higher than the resonant frequency. As saturation of the transformer core is reduced, frequency of self-oscillating circuit may more closely approach the resonant frequency of the resonant load. Minimizing saturation can allow for a gain in efficiency of up to about 10%

Saturation may be reduced by increasing impedance in the circuit, making high impedance desirable on the base drive components. Construction of transformer 357 may differ from that of transformer 257 to increase impedance and minimize saturation. Any one or more of (1) an increase in core cross section, (2) additional turnings in windings 323, 325, 327, or (3) and increased permeability of the core may be applied to reduce saturation by increasing impedance. In embodiments, impedance across primary winding 323 is relatively high, between 1 and 1000 micro Henrys, and typically about 80 micro Henrys.

The location of primary winding 323 of base transformer 357 within the cathode conduction loop, and the associated reduction in current requires a different winding impedance on the primary and secondary windings than that of transformer 257. Generally, the number of primary windings should be increased. The winding turns should be chosen as part of phase relationship control, such that the operating frequency of the self oscillating circuit about the center of the half bridge most closely approaches the resonant frequency of the load, as is most efficient. In all cases, the inductance must cause sufficient voltage drop to trigger the bases of the transistors 219, 221.

Load balancing diodes 303 and 305 are added to protect the base-emitter diode of transistors 221 and 219, respectively. Diodes 303 and 305 operate to block current when the respective associated secondary windings 325 and 327 are reverse biased due to excessive voltage. They perform the additional function of balancing paths for the drive current in reverse direction, as may occur in the event a cathode filament 234, 238 is failing in an open or high impedance mode.

A failing filament with abnormally high impedance causes reduced current to be passed through the cathode conduction loop, in accordance with Ohm's law. However, enough current may be driven by coupling between the secondary windings 325, 327 to cause low voltage signals to be transmitted to the bases of transistors 219 and 221, even when impedance values of base drive resistors 229 and 255 are suitably high. The low voltage of these signals may not be consistently low enough to cease triggering the transistors 219 and 221, allowing oscillation of the ballast circuit to continue despite the failure mode of the lamp. As the voltage of these signals may vary between levels sufficient and insufficient to trigger the bases of transistors 219 and 221, start-stop operation, visually disturbing pulsing of the lamp, continuous or uneven powering with attendant overheating of single cathodes, and reduced light output may all result. These undesirable effects are prevented by the addition of decoupling capacitor 307. Capacitor 307 dampens the base drive signal sufficiently to prevent low voltage drive signals from triggering transistors 219 and 221. In embodiments, capacitors in the 10s of nano farads, such as 22 nano farads, are desirable for dampening capacitor 307, although higher capacitances may be desirable for higher lamp wattages. Referring briefly to FIG. 3b, dampening capacitor 307 may alternatively be placed between base of first transistor 219 and circuit common 203, although it is more efficient as described and shown in parallel with diode 303. Additionally, dampening capacitors may be placed in both locations, although the capacitance of the two capacitors may not be equivalent. The arrangement of double dampening capacitors is generally not required. However, this may be desirable under very high loads, for example when multiple discharge tubes are driven by the ballast circuit.

Referring again to FIG. 3a, an initial base pulse is provided to base of transistor 219 by ignition component 216 as described in reference to FIG. 2. In operation, startup capacitor 211 is charged through charging resistor 205. Resistor 205 and bleed resistor 213 provide a divider to prevent overcharge of startup capacitor 211. Resistors 205 and 213 are typically of relatively high resistance values, with the resistance value of charging resistor 205 higher than that of bleed resistor 213. In embodiments, the resistance of bleed resistor 213 is typically about half that of charging resistor 205, for example 470 kilo ohms and 910 kilo ohms, respectively. Once charge of capacitor 211 is sufficient to break down diac 215 to conductance, this first conductance provides the initial base pulse to transistor 219. In embodiments, the diac breaks down at 32 volts, although this may vary depending on the voltage necessary to trigger the base of transistor 219. Power to the collector of transistor 219 is provided during this initial cycle through initial supply resistor 207, which is typically of high resistive value. In subsequent cycles, power to base of transistor 219 is drawn from capacitor 211 through diode 209, keeping the charge on capacitor 211 below the breakdown value of diac 215 and preventing the re-firing of the initial base pulse.

CONCLUSION, RAMIFICATIONS, AND SCOPE

Thus the reader will see that at least one embodiment of the invention provides a more efficient, cost effective electronic ballast for discharge lamps that incorporates end of lamp life protection that meets applicable IEC standards. Embodiments demonstrate improved safety due to the end of lamp life protection. Embodiments are compact providing an advantage over many of the referenced solutions. Indeed, embodiments may be reduced further in size by packaging some subsets of components within integrated circuits. The embodiments additionally demonstrate other desirable features, such as self-correcting behaviors in response to environmental stimuli.

While the above description contains many specificities, these should not be construed as limitations on the scope, but rather as an exemplification of preferred embodiments thereof. Many other variations are possible. The invention is useful for applications other than just fluorescents. Accordingly, the scope should be determined not by the embodiments illustrated, but by the appended claims and their legal equivalents.

What is claimed is:

1. A gas discharge lamp ballast with end of life circuit protection, comprising:
   a primary winding of a transformer operationally coupled in a series with at least one pair of electrode filaments;
   a plurality of secondary windings of the transformer, each operationally connected to one of a plurality of switching devices at the base thereof;
   at least one decoupling device associated with the base of one of the plurality of switching devices;
   a resonant capacitor coupled in parallel with the series;
   the primary winding of the base drive transformer is within a cathode conduction loop of the lamp ballast, wherein a resonant current is directed away from the plurality of electrode filaments, and a decoupling capacitor damps erroneous base drive signals as a lamp nears end of lamp life wherein the ballast is forced to cease oscillation when a cathode filament opens or presents unduly high impedance.

2. An end of life protection circuit in a discharge lamp ballast, comprising:
   a transformer with a relatively high impedance on a primary winding thereof, the primary winding operationally coupled in a series with a plurality of electrode filaments;
   a plurality of secondary windings of the transformer, each operationally connected to one of a plurality of switching devices in a self-oscillating circuit at the base thereof;
   for each of the plurality of switching devices, at least one current balancing diode associated with each base thereof, wherein a pair of load balancing diodes protect the oscillating switching devices from damage due to reverse bias in current which may occur as a lamp approaches end of lamp life;
   a first resonant capacitor coupled in parallel with the series;
   a secondary resonant capacitor coupled in parallel with the series within the cathode conduction loop.

3. The end of life protection circuit in a discharge lamp ballast of claim 2, wherein the impedance is between 1 and 1000 micro Henrys.

4. The end of life protection circuit in a discharge lamp ballast of claim 3, further comprising a second resonant capacitor operationally coupled in series with the plurality of electrode filaments and primary winding.

5. The end of life protection circuit in a discharge lamp ballast of claim 4, wherein the capacitance is divided between the first and second resonant capacitors in a ratio of 80%-20%, respectively.

6. The end of life protection circuit in a discharge lamp ballast of claim 5, wherein the at least one current balancing diodes protect oscillating switching devices from damage due to reverse bias in current.

7. The end of life protection circuit in a discharge lamp ballast of claim 6, further comprising at least one decoupling device operatively connected to damp any induced voltages due to coupling between the secondary windings.

8. The end of life protection circuit in a discharge lamp ballast of claim 7, wherein the decoupling device is a capacitor.

9. The end of life protection circuit in a discharge lamp ballast of claim 8, wherein the operational connection between each of the plurality of secondary windings and each of the plurality of transistors at the base thereof further comprises a resistor of relatively high impedance.

10. An end of life protection circuit in a discharge lamp ballast, comprising:
    a resonant load circuit wherein resonant capacitance is distributed over a plurality of capacitors;
    a primary winding of a transformer operationally coupled in a series with at least one of the plurality of capacitors;
    a plurality of secondary windings of the transformer, each operationally connected to one of a plurality of switching devices at the base thereof;
    at least one decoupling device associated with the base of a first one of the plurality of switching devices;
    for each of the plurality of switching devices, at least one current balancing diode associated with each base thereof;
    wherein the protection circuit turns off the ballast and lamp in both high impedance and open cathode end of lamp life failure modes.

11. The end of life protection circuit in a discharge lamp ballast of claim 10 wherein the decoupling device is arranged in parallel across base and emitter of the first one of the plurality of switching devices with a series consisting of one of the plurality of secondary windings and resistor; and also in parallel with a balancing diode.

12. The end of life protection circuit in a discharge lamp ballast of claim 11 wherein primary and secondary windings and a core of the transformer are designed so that an oscillating frequency of the lamp ballast approaches a resonant frequency of the resonant load circuit.

13. The end of life protection circuit in a discharge lamp ballast of claim 12, wherein the majority of the resonant capacitance in the circuit is associated with a first of the plurality of resonant capacitors.

14. The end of life protection circuit in a discharge lamp ballast of claim 13, wherein decoupling device damps erroneous base drive signals generated by coupling in the plurality of secondary windings, forces the ballast circuit to cease oscillation when a cathode filament associated with the fluorescent discharge lamp opens or presents unduly high impedance.

15. An end of life protection circuit for a self-oscillating resonant electronic discharge lamp ballast, comprising an AC to DC rectification wherein AC current is supplied to a circuit hot wire through a charging resistor to an anode of a branch drawdown diode and to a first lead of a diac, starting capacitor and a bleed resistor; second leads of the start-up capacitor and bleed resistor are connected to a circuit neutral wire; a second lead of the diac connects to the base of a first transistor; the hot wire is connected in series through a fusible resistor to an EMI suppression capacitor and an EMI suppression inductor; the suppression inductor is connected through an AC terminal of a diode bridge rectifier, while a second AC terminal of the diode bridge rectifier is connected back to the EMI suppression capacitor and to the circuit neutral wire; a positive terminal of the diode bridge rectifier is connected to a positive terminal of an electrolytic capacitor and to a positive bus wire; a negative terminal of diode bridge rectifier is connected to the negative terminal of the electrolytic capacitor and to negative bus wire; an anode of a second load balancing diode connects to a half-bridge point, while a cathode of the second load balancing diode is connected to a base of a second transistor; a first lead of a dampening capacitor is connected to the half-bridge point, while a second lead of a dampening capacitor is connected to the base of the second transistor, in parallel with the second load balancing diode; an anode of a first load balancing diode connects to the circuit neutral wire, while a cathode of a first load balancing diode is connected to a base of a first transistor; a first lead of a primary resonant capacitor is connected to a second lead of a DC blocking capacitor and to a first pin and second lead of the DC blocking capacitor is connected to a fourth pin and first lead of the resonant inductor, such that a primary winding of a base drive transformer is in series between a second pin and a secondary resonant capacitor in a cathode conduction loop.

16. An end of life protection circuit for a self-oscillating resonant electronic discharge lamp ballast as defined in claim 15, wherein the base drive transformer includes two secondary windings and two base current resistors; further comprising a decoupling capacitor in parallel with the second load balancing diode that dampens a base drive signal to prevent low voltage drive signals from triggering the transistors, such that the lamp ballast ceases oscillation when a cathode filament opens or presents unduly high impedance.

17. An end of life protection circuit for a self-oscillating resonant electronic discharge lamp ballast as defined in claim 16, further comprising a first lead of a second snubber capacitor connected to the half-bridge point and a second lead of the second snubber capacitor connects to the neutral wire.

18. An end of life protection circuit for a self-oscillating resonant electronic discharge lamp ballast as defined in claim 17, further comprising a first lead of a second dampening capacitor connected to the neutral wire, with a second lead of the second dampening capacitor connected to the base of first transistor in parallel the first load balancing diode.

19. An end of life ballast circuit for driving a discharge lamp, comprising:
   a self-oscillating circuit;
      a partial series-resonant circuit which is completed by the inclusion of a plurality of closed electrode filaments;
      a primary winding of a transformer operationally coupled to the resonant circuit such that the flow of current through the primary winding requires that each of the plurality of electrode filaments be present and closed; and
      at least one secondary winding of the transformer operatively coupled to a switching device in the self-oscillating circuit at the gate thereof, wherein the signal delivered to the gate is dampened.

20. A method for illuminating a discharge tube, comprising the steps of
   a) dividing the capacitance of a resonant load on a self-oscillating ballast such that the majority of resonating current does not pass through any one of a plurality of electrode filaments in the discharge tube;
   b) drawing a transistor switching signal from current that passes through any one or more of the plurality of electrode filaments in the discharge tube; and
   c) dampening the switching signal to prevent weak signals from causing the ballast to oscillate
   d) turning off the lamp and ballast in both high impedance and open cathode end of lamp life failure modes by stopping oscillation of the ballast circuit.

* * * * *